US005397624A

United States Patent [19]

Moyaerts et al.

[11] Patent Number: 5,397,624

[45] Date of Patent: Mar. 14, 1995

[54] PRESSURE-SENSITIVE COPYING PAPER

[75] Inventors: Daniel G. Moyaerts; Christian Y. A. M. De Raedt, both of Brussels; Michael E. Hobson, Waterloo, all of Belgium

[73] Assignee: The Wiggins Teape Group Limited, England

[21] Appl. No.: 78,845

[22] Filed: Jun. 21, 1993

[30] Foreign Application Priority Data

Jun. 23, 1992 [GB] United Kingdom ................. 9213279

[51] Int. Cl.$^6$ ................................................ B32B 3/00

[52] U.S. Cl. ................................. 428/195; 428/321.1; 428/409; 428/511; 428/514; 428/688

[58] Field of Search ........................ 346/207; 503/209; 428/195, 913, 914, 409, 321.1, 511, 514, 688; 430/137

[56] References Cited

U.S. PATENT DOCUMENTS

| | | | |
|---|---|---|---|
| 4,295,662 | 10/1981 | Tutty | 282/27.5 |
| 4,298,651 | 11/1981 | Tutty | 428/307 |
| 4,339,275 | 7/1982 | Tutty | 524/255 |
| 4,486,762 | 12/1984 | Okamoto et al. | 346/207 |
| 4,688,060 | 8/1987 | Tanaka et al. | 503/214 |
| 4,888,334 | 12/1989 | Ohga et al. | 503/214 |
| 4,962,072 | 10/1990 | Cooper et al. | 503/200 |
| 5,177,051 | 1/1993 | Hobson et al. | 503/209 |

FOREIGN PATENT DOCUMENTS

| | | |
|---|---|---|
| 0186516 | 7/1986 | European Pat. Off. . |
| WO88/04614 | 6/1988 | European Pat. Off. . |
| 2453026 | 10/1980 | France . |
| 3604343 | 8/1986 | Germany . |
| 3075189 | 3/1991 | Japan . |
| 3108579 | 5/1991 | Japan . |
| 04070375 | 3/1992 | Japan . |
| 04255388 | 9/1992 | Japan . |
| 1483479 | 8/1977 | United Kingdom . |
| 2174425A | 11/1986 | United Kingdom . |
| 2204610A | 11/1988 | United Kingdom . |
| 2204610 | 11/1988 | United Kingdom . |

OTHER PUBLICATIONS

W. R. Reynolds, ed., *The Sizing of Paper,* 2d ed., Tappi Press (1989), pp. 33–49.

"Colle SP 6", promotional literature.

"Basoplast 400 DS", promotional literature.

*Primary Examiner*—Patrick J. Ryan

*Assistant Examiner*—William A. Krynski

*Attorney, Agent, or Firm*—Burns, Doane, Swecker & Mathis

[57] ABSTRACT

A styrene-acrylic ester copolymer latex is used for prevention of premature coloration in CFB pressure-sensitive copying paper which is neutral- or alkaline-sized with an alkyl ketene dimer and which utilizes an acid clay or other inorganic color developer composition. The copolymer may be carried by the base paper, e.g. as a result of size press or size bath application, or may be present in the microcapsule coating.

16 Claims, No Drawings

PRESSURE-SENSITIVE COPYING PAPER

This invention relates to pressure-sensitive copying paper, also known-as carbonless copying paper.

Pressure-sensitive copying paper sets may be of various types. The commonest, known as the transfer type, comprises an upper sheet (usually referred to as a CB or coated back sheet), coated on its lower surface with microcapsules containing a solution in an oil solvent of at least one chromogenic material and a lower sheet (usually referred to as a CF or coated front sheet) coated on its upper surface with a colour developer composition. If more than one copy is required, one or more intermediate sheets (usually referred to as CFB or coated front and back sheets) are provided, each of which is coated on its lower surface with microcapsules and on its upper surface with colour developer composition. Pressure exerted on the sheets by writing, typing or other imaging pressure ruptures the microcapsules, thereby releasing chromogenic material solution onto the colour developer composition and giving rise to a chemical reaction which develops the colour of the chromogenic material and so produces an image.

The present invention is particularly concerned with pressure-sensitive copying paper of the CFB type. A potential problem with such paper is that any free chromogenic material solution in the microcapsule coating may migrate through the paper into contact with the colour developer coating, with the result that premature colouration occurs. The presence of free chromogenic material is almost inevitable, firstly because a small proportion of chromogenic material is always left unencapsulated at the conclusion of the microencapsulation process, and secondly because a small proportion of the microcapsules rupture prematurely during processing of the paper (coating, drying, reeling etc.) or on handling or storage of the paper.

We have observed that the above-described problem of premature colouration, which becomes worse when the paper is under conditions of high temperature and/or humidity, is generally significant only when the base paper is neutral-or alkaline-sized with an alkyl ketene dimer size and when the colour developer used is an acid clay, for example an acid-washed dioctahedral montmorillonite clay, or other inorganic colour developer, for example alumina-silica material. Alkyl ketene dimer neutral or alkaline sizing is very well-known in the paper industry (see for example Chapter 2 of "The Sizing of Paper" second edition, published in 1989 by TAPPI Press) and does not therefore require further description.

The reasons why the problem of premature colouration is significant only when the base paper is neutral- or alkaline-sized with an alkyl ketene dimer size and when the colour developer is inorganic have not been fully elucidated.

Our European Patent Application No. 491487A discloses that the problem of premature colouration can be countered by treating the base paper with an extracted and isolated soy protein polymer, and/or by incorporating such a polymer in the microcapsule coating.

We have now found that the above-described problem of premature colouration can also be significantly reduced if the alkyl ketene dimer neutral- or alkaline-sized base paper is treated with styrene-acrylic ester copolymer latex prior to application of the inorganic colour developer and microcapsule coatings, or if styrene-acrylic ester copolymer latex is present in the microcapsule coating. These two solutions to the problem can of course also be combined, i.e. alkyl ketene dimer neutral- or alkaline-sized base paper is treated with styrene-acrylic ester copolymer latex, after which a microcapsule composition containing styrene-acrylic ester copolymer latex is applied to the thus pre-treated base paper. Prior to the application of the microcapsule composition, the pre-treated base paper is coated with inorganic colour developer composition on its surface opposite to that to which the microcapsule composition is applied.

Accordingly, the present invention provides pressure-sensitive copying paper comprising base paper neutral- or alkaline-sized with an alkyl ketene dimer size and carrying on one surface a coating of pressure-rupturable microcapsules containing an oil solution of chromogenic material and on the other surface a coating of an inorganic colour developer composition, characterized in that styrene-acrylic ester copolymer latex is carried by the base paper, and/or is present in the microcapsule coating.

By a styrene-acrylic ester copolymer is meant a copolymer of which styrene and acrylic ester are the only significant comonomer components or are the major comonomer components.

Application of the copolymer latex to the base paper is conveniently carried out at a size press or size bath on the papermachine on which the paper is produced.

Whilst a size press or size bath is a particularly convenient and economical means of applying the copolymer latex, other treatment methods are in principle usable, for example spraying, passage through an impregnating bath, coating by any of the methods conventional in the paper industry, or application by a printing technique.

Styrene-acrylic ester copolymer latices are commercially available from a number of suppliers. Examples of such latices, suitable for use in the present invention, are the anionic paper sizing materials supplied under the designations "Colle SP6" by Eka Nobel and "Basoplast 400 DS" by BASF. Styrene and acrylic ester are believed to be the only significant comonomers in "Colle SP6" and this may well be the case for "Basoplast 400" as well. The precise chemical composition of the materials is not revealed by the manufacturers. Styrene-acrylic ester latices which foam easily may not be suitable for use in the present invention, as if a defoamer has to be added as well, it may impair the beneficial sizing effect of the latex.

When applied to the base paper, the styrene-acrylic ester copolymer latex is preferably used in a blend with a conventional gelatinized starch or other surface sizing agent. For economic reasons, the starch sizing agent is preferably present in a proportion of at least about 50% by weight based on the total weight of copolymer latex and starch, since gelatinized starch is cheaper than styrene-acrylic ester copolymer latex. The dry weight of styrene-acrylic ester copolymer applied is typically in the range 0.02 to 0.2 g $m^{-2}$ on a dry basis.

When present in the microcapsule coating, the amount of styrene-acrylic ester copolymer latex present is typically in the range 0.04 to 0.4 g $m^{-2}$ on a dry basis. The typical usage amount ranges just quoted can of course be lowered if styrene-acrylic ester copolymer latex is both applied to the base paper and present in the microcapsule coating.

Apart from the presence of the styrene-acrylic ester copolymer latex, the present pressure-sensitive copying aper may be conventional. Such paper is very widely isclosed in the patent and other literature, and so will ɔt be discussed extensively herein. By way of example, ɔwever:

(i) the microcapsules may be produced by coacervation of gelatin and one or more other polymers, e.g. as described in U.S. Pat. Nos. 2800457; 2800458; or 3041289; or by in situ polymerisation of polymer precursor material, e.g. as described in U.S. Pat. Nos. 4001140; and 4105823;

(ii) the chromogenic materials used in the microcapsules may be phthalide derivatives, such as 3,3-bis(4-dimethylaminophenyl)-6-dimethylaminophthalide (CVL) and 3,3-bis(1-octyl-2-methylindol-3-yl)phthalide, or fluoran derivatives, such as 2'-anilino-6'-diethylamino-3'-methylfluoran, 6'-dimethylamino-2'-(N-ethyl-N-phenylamino-4'-methylfluoran), and 3'-chloro-6'-cyclohexylaminofluoran;

(iii)the solvents used to dissolve the chromogenic materials may be partially hydrogenated terphenyls, alkyl naphthalenes, diarylmethane derivatives, dibenzyl benzene derivatives, alkyl benzenes and biphenyl derivatives, optionally mixed with diluents or extenders such as kerosene.

The inorganic colour developer material utilised in ıe present pressure-sensitive copying material is typiılly an acid-washed dioctahedral montmorillonite ay, e.g. as described in U.S. Pat. No. 3753761. Such :id clays are widely used as colour developers for ressure-sensitive copying papers, and so need no furıer description. They are normally used with diluents r extenders such as kaolin, calcium carbonate or aluinium hydroxide. The amount of diluent or extender sed is typically in the range 20% to 40% by weight, g. about 30%. Alternative inorganic colour developer aterials include the synthetic alumina-silica material ɔld under the trademark "Zeocopy" by Zeofinn Oy of elsinki, Finland; so-called semi-synthetic inorganic evelopers as disclosed, for example, in European Pant Applications Nos. 44645A and 144472A; and alumia/silica materials such as disclosed in any of our Euroean Patent Applications Nos. 42265A, 42266A, 34306A or 518471A. These materials may be used with iluents or extenders as described above in relation to :id clay colour developers. Mixtures of acid clay deelopers and other types of inorganic developer may of ɔurse also be used.

The thickness and grammage of the base paper may so be conventional, for example the thickness may be the range 60 to 90 microns and the grammage in the nge 35 to 100 g $m^{-2}$. However, it should be noted ıat the problem of premature colouration which the ıvention seeks to overcome arises much more With apers of lower thickness and grammage within the ecified ranges than with papers of higher thickness ıd grammage.

The sizing level of the alkyl ketene dimer is typically the range 2 to 4% by weight, preferably 2.5 to 3.5% y weight.

The invention will now be illustrated by the following Examples, in which all percentages and proportions :e by weight:

EXAMPLE 1

A standard 49 g $m^{-2}$ internally alkaline-sized carbonss base paper having an approximately 14% calcium arbonate filler content and a 3.5% alkylketene dimer ıternal size content was size-press treated (on the paper machine on which it had just been manufactured) with a mixed solution made up from a 3.5% solution of "SP6" styrene-acrylic ester copolymer latex (as supplied at 20% solids content) and 3.5% solution of gelatinized starch sizing agent (as supplied dry). The starch and latex solutions were metered together at flow rates such that the dry pick-up of the copolymer latex/starch mixture was around 0.8 g $m^{-2}$, of which a little over 0.1 g $m^{-2}$ was styrene-acrylic ester copolymer.

The resulting treated paper and a control sample of the same base paper but treated just with starch were then laboratory coated with a conventional colour developer formulation at a coatweight of 7.5 g $m^{-2}$. The colour developer formulation contained 70% acid-washed montmorillonite clay, 15% kaolin and 15% calcium carbonate (30% kaolin, 30% calcium carbonate, or 30% aluminium hydroxide or some mixture of these could equally well have been used, instead of 15% kaolin and 15% calcium carbonate). A conventional styrene-butadiene latex binder was also present. The resulting papers were then coated on their opposite surfaces with a conventional gelatin coacervate microcapsule composition as conventionally used in the production of carbonless copying paper at a coatweight of about 7 g $m^{-2}$. The encapsulated chromogenic composition used a conventional three component solvent blend (partially hydrogenated terphenyls/alkyl naphthalenes/kerosene) and contained crystal violet lactone and other conventional chromogenic materials.

The resulting CFB papers were stored in a climatic oven at 32° C. and 90% relative humidity (RH). After 5 days storage, it was observed that the CFB paper derived from the untreated base paper showed significant discolouration, whereas the copolymer/starch-treated base paper did not. After three weeks' storage under the same conditions, the discolouration of the untreated paper was considerably worse, whereas the treated paper still showed no significant overall discolouration, although a slight increase in spottiness was observed. The reflectance values of the papers were monitored, as compared to a white standard, and were as follows (the higher the reflectance, the less the discolouration):

| | Initial Reflectance (%) | Reflectance After 5 days (%) | Reflectance After 3 weeks (%) |
|---|---|---|---|
| Control | 82 | 76 | 52 |
| Treated | 82 | 81 | 80 |

The observed slight increase in spottiness was not of concern in that it was thought to be simply the result of the limitations inherent in the use of a laboratory-scale coater.

EXAMPLE 2

This illustrates the use of smaller proportions of styrene-acrylic ester copolymer latex/starch mixture.

The procedure was generally as described in Example 1 except that:

(i) 39 g $m^{-2}$ base paper with 3–4% calcium carbonate filler content was used;

(ii) the colour developer formulation was applied on the same machine as the paper was made at a coatweight of about 7 g $m^{-2}$ (dry); and (iii) two different treating solutions were applied at the size-press. The treating solutions were mixed solutions of either (a) 2.3% or (b) 1.2% "SP6"

styrene-acrylic ester copolymer latex (as supplied at 20% solids content) and, in each case, 3.5% gelatinized starch (as supplied dry). These solutions were metered together at flow rates such that the dry amount of latex applied to the paper was about 0.06 or 0.03 g $m^{-2}$ for treating solutions (a) and (b) respectively.

As with Example 1, the CFB paper derived from the untreated base paper showed significant discolouration, whereas the paper according to the invention did not. The reflectance data was as follows:

| | Initial Reflectance (%) | Reflectance After 5 days (%) | Reflectance After 3 weeks (%) |
|---|---|---|---|
| Untreated | 82 | 75 | 59 |
| Treated - soln. (a) | 82 | 81 | 80 |
| Treated - soln. (b) | 82 | 81 | 81 |

EXAMPLE 3

This illustrates the inclusion of a proportion of styrene-acrylic ester copolymer latex in a conventional gelatinized starch binder in the microcapsule coating of a CFB paper.

Two microcapsule batches were made up at a solids content of 24% from microcapsules (c.66% on a dry weight basis), a 50/50 mixture of ground cellulose fibre floc and granular wheatstarch particles as a stilt material (c. 20% on a dry weight basis) and a binder (c. 14% on a dry weight basis). In one case the binder was according to the invention and was a mixture of gelatinized starch and styrene-acrylic ester copolymer latex ("SP6") in a 90:10 ratio on a dry basis and in the other case the binder was a conventional gelatinized starch binder, to provide a control.

The microcapsule batches were separately coated on to the uncoated surface of a conventional CF paper at the same 5 to 6 g $m^{-2}$ target dry coatweight in each case by means of a pilot-scale metering roll coater. The amount of styrene-acrylic ester copolymer latex present was therefore around 0.06 g $m^{-2}$. The active ingredient of the colour developer composition was an acid-washed dioctahedral montmorillonite clay. The colour developer coatweight was about 7 g $m^{-2}$ and the grammage of the CF paper before microcapsule coating was about 46 g $m^{-2}$. The base paper had been internally neutrally sized with a conventional alkyl ketene dimer size. The microcapsules were as described in Example 1.

Samples of the resulting microcapsule papers were stored in a climatic oven for 5 days at 32° C. and 90% RH. The mean reflectance values, obtained as described in example 1, were as follows:

| | Initial reflectance (%) | Reflectance After 5 days (%) |
|---|---|---|
| Control | 81 | 77 |
| Invention | 82 | 79 |

It will be seen that the inclusion of a small proportion of styrene-acrylic ester copolymer latex improved the resistance to discolouration.

The papers were also tested for imaging performance in a pressure-sensitive copying set and both were found satisfactory.

EXAMPLE 4

This illustrates the use of a lower styrene-acrylic ester copolymer content than in previous examples, achieved by use of 0.8% and 0.5% solutions of "SP6" copolymer latex (as supplied at 20% solids content), together with 3.5% gelatinized starch solution in each case.

The procedure was as in Example 2, except that the calcium carbonate filler content of the base was 5-6% and no untreated control paper was produced.

The initial reflectance was 82%, and the values after both 5 days and 3 weeks storage at 32° C. and 90% RH were 81% for papers of both filler contents.

EXAMPLE 5

This illustrates the use of the present invention with microcapsules containing a solvent composition of the kind disclosed in our European Patent Application No. 520639A, specifically a 1:1 blend of rapeseed oil and 2-ethylhexyl cocoate. The solvent composition contained crystal violet lactone and other conventional chromogenic materials.

The procedure was generally as described in Example 1, except that the internally alkaline-sized base paper was derived from totally chlorine free pulp and had no significant filler content and the size press composition was a mixed solution of 3.5% gelatinized starch and 0.8% "SP6" styrene-acrylic ester copolymer latex (as supplied at 20% solids content). An otherwise-similar control paper was prepared using just 3.5% gelatinized starch at the size press. The dry pick-up of the latex-/starch mixture was as in Example 1, and the amount of dry copolymer applied to the paper was about 0.02 g $m^{-2}$.

The reflectance data was as follows:

| | Initial Reflectance (%) | Reflectance After 5 Days (%) |
|---|---|---|
| Control | 78 | 71 |
| Treated | 79 | 79 |

It will be seen that the inclusion of a small proportion of styrene-acrylic ester copolymer latex improved the resistance to discolouration.

EXAMPLE 6

This illustrates the use of the present invention with a different styrene-acrylic ester copolymer latex from that used in previous Examples, namely "Basoplast 400 DS".

The procedure was as in Example 2, except that the treating solution was a mixed solution of 0.8% "Basoplast 400 DS" styrene-acrylic ester copolymer latex (as supplied at 25% solids content) and 3.5% gelatinized starch (as supplied dry). On a dry basis therefore the treating solution contained 0.2% copolymer latex and 3.5% starch. As with previous Examples, the final treated CFB paper showed markedly less discolouration than an untreated CFB control. The reflectance data was as follows:

| | Initial Reflectance (%) | Reflectance After 5 days (%) | Reflectance After 3 weeks (%) |
|---|---|---|---|
| Untreated | 83 | 76 | 57 |

-continued

| | Initial Reflectance (%) | Reflectance After 5 days (%) | Reflectance After 3 weeks (%) |
|---|---|---|---|
| ated | 83 | 82 | 79 |

EXAMPLE 7

This illustrates the use of "Basoplast 400 DS" sty-ie-acrylic ester latex in the microcapsule coating of a 'B paper.

The procedure was as in Example 3, except that the P6" brand of latex was replaced by the "Basoplast ) DS" brand.

The reflectance data obtained was as follows:

| | Initial Reflectance (%) | Reflectance After 5 days (%) | Reflectance After 3 weeks (%) |
|---|---|---|---|
| ntrol | 83 | 69 | 50 |
| ention | 83 | 76 | 68 |

will be seen that the inclusion of the styrene-acrylic :er copolymer latex improved the resistance to dis-louration.

EXAMPLE 8

This illustrates the use of the invention with a copy-; paper of which the active ingredients of the inor-nic colour developer composition were acid clay as ed in previous Examples and "Zeocopy" alumina-ica material. These active ingredients were used in 1:1 ight ratio. Kaolin was also present as a diluent in an iount of 30% by weight based on the total weight of tive colour developing ingredients and diluent.

The base paper used was as in Example 2 except that had a slightly lower grammage, and the colour devel-er composition was applied at a dry coatweight of out 7 g $m^{-2}$. The treating solution was applied at the :e press, and contained 2.3% "SP6" styrene-acrylic ter copolymer latex (based on the latex as supplied at % solids content) and 3.5% gelatinized starch (as pplied dry). The latex and starch solutions were me-red together at flow rates such that the dry pick-up of ating solution was about 0.8 g $m^{-2}$ and the amount of :ex applied to the paper was about 0.04 g $m^{-2}$ on a dry sis.

The paper was tested as described in previous Exam-es, and the reflectance data obtained was as follows:

| Initial Reflectance (%) | Reflectance After 5 days (%) |
|---|---|
| 83 | 82 |

n this occasion there was no untreated control sample 'ailable for comparison purposes, but it will be noted at the only very slight decline in reflectance value ter 5 days was comparable to that in previous Exam-es. It can be concluded therefore that the styrene-:rylic ester is having the same beneficial effect in coun-ring discolouration.

We claim:

1. Pressure-sensitive copying paper comprising base iper neutral- or alkaline-sized with an alkyl ketene mer size and treated with a styrene-acrylic ester co-olymer latex, wherein said base paper is coated on one surface with pressure-rupturable microcapsules containing an oil solution of chromogenic material and coated on the other surface with an inorganic colour developer composition.

2. Pressure-sensitive copying paper as claimed in claim 1, wherein the styrene-acrylic ester copolymer latex is mixed with gelatinized starch.

3. Pressure-sensitive copying paper as claimed in claim 2, wherein the gelatinized starch makes up at least 50% of the mixture of starch and styrene-acrylic ester copolymer latex.

4. Pressure-sensitive copying paper as claimed in claim 1, wherein the amount of styrene-acrylic ester copolymer latex present is in the range of 0.02 to 0.2 g $m^{-2}$ on a dry basis.

5. Pressure-sensitive copying paper as claimed in claim 1, wherein the amount of styrene-acrylic ester copolymer latex present is in the range 0.04 to 0.4 g $m^{-2}$on a dry basis.

6. Pressure-sensitive copying paper comprising base paper neutral- or alkaline-sized with an alkyl ketene dimer size and treated with a styrene-acrylic ester copolymer latex, wherein said base paper is coated on one surface with pressure-rupturable microcapsules containing an oil solution of chromogenic material and coated on the other surface with a coating of an inorganic colour developer composition, wherein said styrene-acrylic ester copolymer latex consists essentially of styrene and acrylic ester as the comonomer components of the copolymer latex.

7. Pressure-sensitive copying paper as claimed in claim 1, wherein the inorganic colour developer composition comprises an acid clay.

8. Pressure-sensitive copying paper as claimed in claim 1, wherein the inorganic colour developer composition comprises an alumina-silica material.

9. Pressure-sensitive copying paper as claimed in claim 1, wherein the alkyl ketene dimer size is present at a level in the range of 2 to 4% by weight, based on the weight of the base paper alone, i.e. excluding the subsequently applied coatings and latex.

10. Pressure sensitive copying paper as claimed in claim 1, wherein a styrene-acrylic ester copolymer latex is present in the microcapsule coating.

11. Pressure-sensitive copying paper comprising base paper neutral- or alkaline-sized with an alkyl ketene dimer size and coated on one surface with pressure-rupturable microcapsules containing an oil solution of chromogenic material and on the other surface with an inorganic colour developer composition, wherein a styrene-acrylic ester copolymer latex is present in the microcapsule coating.

12. Pressure-sensitive copying paper as claimed in claim 11, wherein the amount of styrene-acrylic ester copolymer latex present is in the range 0.04 to 0.4 g $m^{-2}$ on a dry basis.

13. Pressure-sensitive copying paper comprising base paper neutral- or alkaline-sized with an alkyl ketene dimer size and coated on one surface with pressure-rupturable microcapsules containing an oil solution of chromogenic material and coated on the other surface with a coating of an inorganic colour developer composition wherein a styrene-acrylic ester copolymer latex is present in the microcapsule coating, and wherein said styrene-acrylic ester copolymer latex consists essentially of styrene and acrylic ester the comonomer components of the copolymer latex.

14. Pressure-sensitive copying paper as claimed in claim 11, wherein the inorganic colour developer composition comprises an acid clay.

15. Pressure-sensitive copying paper as claimed in claim 11, wherein the inorganic colour developer composition comprises an alumina-silica material.

16. Pressure-sensitive copying paper as claimed in claim 11, wherein the alkyl ketene dimer size is present at a level in the range of 2 to 4% by weight, based on the weight of the base paper alone, i.e. excluding the subsequently applied coatings.

* * * * *